(12) United States Patent
Nguyen et al.

(10) Patent No.: US 7,690,431 B2
(45) Date of Patent: Apr. 6, 2010

(54) METHODS FOR CONTROLLING MIGRATION OF PARTICULATES IN A SUBTERRANEAN FORMATION

(75) Inventors: Philip D. Nguyen, Duncan, OK (US); Mauricio Gutierrez, Bogota (CO)

(73) Assignee: Halliburton Energy Services, Inc., Duncan, OK (US)

( * ) Notice: Subject to any disclaimer, the term of this patent is extended or adjusted under 35 U.S.C. 154(b) by 0 days.

(21) Appl. No.: 11/985,153

(22) Filed: Nov. 14, 2007

(65) Prior Publication Data

US 2009/0120639 A1    May 14, 2009

(51) Int. Cl.
*E21B 37/08* (2006.01)
*E21B 33/13* (2006.01)

(52) U.S. Cl. .................. 166/311; 166/281; 166/295; 166/304

(58) Field of Classification Search ............. None
See application file for complete search history.

(56) References Cited

U.S. PATENT DOCUMENTS

| | | | | |
|---|---|---|---|---|
| 3,329,204 | A | 7/1967 | Brieger | 166/13 |
| 5,361,856 | A | 11/1994 | Surjaatmadja et al. | 175/67 |
| 5,494,103 | A | 2/1996 | Surjaatmadja et al. | 166/222 |
| 5,765,642 | A | 6/1998 | Surjaatmadja | 166/297 |
| 5,833,000 | A | 11/1998 | Weaver et al. | 166/276 |
| 5,839,510 | A | 11/1998 | Weaver et al. | 166/276 |
| 5,853,048 | A | 12/1998 | Weaver et al. | 166/279 |
| 6,311,773 | B1 | 11/2001 | Todd et al. | 166/280 |
| 6,478,088 | B1 | 11/2002 | Hansen et al. | 166/285 |
| 6,877,563 | B2 | 4/2005 | Todd et al. | 166/312 |
| 7,021,383 | B2 | 4/2006 | Todd et al. | 166/307 |
| 7,131,491 | B2 | 11/2006 | Blauch et al. | 166/276 |
| 2003/0230408 | A1 | 12/2003 | Acock et al. | 166/297 |
| 2005/0277554 | A1 | 12/2005 | Blauch et al. | 507/224 |
| 2007/0029086 | A1 | 2/2007 | East, Jr. | 166/278 |
| 2007/0114032 | A1* | 5/2007 | Stegent et al. | 166/287 |

FOREIGN PATENT DOCUMENTS

| | | |
|---|---|---|
| EP | 0851094 A2 | 12/1997 |
| EP | 1384851 A2 | 7/2003 |

OTHER PUBLICATIONS

Martin, A.N., *Stimulating Sandstone Formations with non-HF Treatment Systems*. SPE Paper No. 90774, 2004.
Nowke, et al., *Phosphonic Acid Complex for Stimulating HF-Sensitive Reservoirs—A Revolutionary Response*. SPE Paper No. 89415, 2004.
Search Report and Written Opinion of International Application No. PCT/GB2008/003568, Oct. 20, 2008.

* cited by examiner

*Primary Examiner*—Zakiya W. Bates
(74) *Attorney, Agent, or Firm*—Robert A. Kent; Baker Botts LLP

(57) ABSTRACT

Methods comprising: providing a subterranean formation penetrated by a well bore wherein the well bore comprises perforated casing that comprises a plurality of perforations, providing an acidic treatment fluid comprising an aqueous base fluid and an acid composition, placing the acidic treatment fluid in the well bore in a manner that allows the acidic treatment fluid to reduce debris present in the perforations, providing a consolidating agent, and placing the consolidating agent in a near well bore region.

21 Claims, No Drawings

METHODS FOR CONTROLLING MIGRATION OF PARTICULATES IN A SUBTERRANEAN FORMATION

BACKGROUND

The present invention relates to methods useful in treating subterranean formations, and more particularly, to consolidating relatively unconsolidated portions of subterranean formations and minimizing the flow back of unconsolidated particulate material (referred to collectively herein as "particulate migration").

Hydrocarbon wells are often located in subterranean zones that contain unconsolidated particulates (e.g., formation fines) that may migrate within the subterranean formation with the oil, gas, water, and/or other fluids produced by a well penetrating the subterranean formation. As used herein, the term "unconsolidated particulate," and derivatives thereof, includes loose particulates and particulates bonded with insufficient bond strength to withstand the forces created by the production of fluids through the formation. "Formation fine(s)," another term used herein, refers to any loose particles within the portion of the formation, including, but not limited to, formation fines, formation sand, clay particulates, coal fines, and the like.

The presence of these unconsolidated particulates in produced fluids is disadvantageous and undesirable in that the particulates may abrade pumping and other producing equipment and reduce the fluid production capabilities of producing zones. Unconsolidated subterranean zones include those that contain loose particulates and those wherein the bonded particulates have insufficient bond strength to withstand the forces produced by the production of fluids through the zones. "Zone" as used herein simply refers to a portion of the formation and does not imply a particular geological strata or composition.

One method of controlling particulates in such unconsolidated formations has been to produce fluids from the formations at low flow rates, so that the near well stability of sand bridges and the like may be substantially preserved. The collapse of such sand bridges, however, may nevertheless occur, possibly due to unintentionally high production rates and/or pressure cycling as may occur from repeated shut-ins and start ups of a well. The frequency of pressure cycling is critical to the longevity of the near well formation, especially during the depletion stage of the well when the pore pressure of the formation has already been significantly reduced.

Another method of controlling particulates in unconsolidated formations involves placing a filtration bed containing gravel (e.g., a "gravel pack") near the well bore to present a physical barrier to the transport of unconsolidated formation fines with the production of desired fluids. Typically, such "gravel-packing operations" involve the pumping and placement of a quantity of certain particulates into the unconsolidated formation in an area adjacent to a well bore. One common type of gravel-packing operation involves placing a screen in the well bore and packing the surrounding annulus between the screen and the well bore with gravel of a specific size designed to prevent the passage of formation sand. The screen is generally a filter assembly used to retain the gravel placed during the gravel-pack operation. A wide range of sizes and screen configurations are available to suit the characteristics of the gravel-pack sand used. Similarly, a wide range of sizes of gravel is available to suit the characteristics of the unconsolidated particulates in the subterranean formation. To install the gravel pack, the gravel is carried to the formation in the form of a slurry by mixing the gravel with a treatment fluid, which is usually viscosified. Once the gravel is placed in the well bore, the viscosity of the treatment fluid may be reduced, and it is returned to the surface. The resulting structure presents a barrier to migrating sand from the formation while still permitting fluid flow.

However, the use of such gravel-packing methods may be problematic. For example, gravel packs may be time consuming and expensive to install. Due to the time and expense needed, it is sometimes desirable to place a screen without the gravel. Even in circumstances in which it is practical to place a screen without gravel, it is often difficult to determine an appropriate screen size to use as formation sands tend to have a wide distribution of grain sizes. When small quantities of sand are allowed to flow through a screen, formation erosion becomes a significant concern. As a result, the placement of gravel as well as the screen is often necessary to assure that the formation sands are controlled. Expandable sand screens have been developed and implemented in recent years. As part of the installation, an expandable sand screen may be expanded against the well bore, cased hole, or open hole for sand control purposes without the need for gravel packing. However, expandable screens may still exhibit such problems as screen erosion and screen plugging.

Another method used to control particulates in unconsolidated formations involves consolidating unconsolidated portions of subterranean producing zones into relatively hard permeable masses by applying a resin followed by a spacer fluid and then a catalyst. Such resin application may be problematic when, for example, an insufficient amount of spacer fluid is used between the application of the resin and the application of the external catalyst. In that case, the resin may come into contact with the external catalyst in the well bore itself rather than in the unconsolidated subterranean producing zone. Furthermore, there is uncertainty as to whether there is adequate contact between the resin and the catalyst. Additionally, when resin is contacted with an external catalyst an exothermic reaction occurs that may result in rapid polymerization, potentially damaging the formation by plugging the pore channels, halting pumping when the well bore is plugged with solid material, or resulting in a down hole explosion as a result of the heat of polymerization. Uniform placement of curable resin into the formations having long intervals is most desirable. However, formations often comprise a wide range of permeabilities even within a reservoir located along a well bore. As a result, completions involving resin consolidation, with conventional diversion techniques, have been applied in intervals of less than 50 feet, and more ideally, less than 30 feet. Also, using resins to consolidate long or large unconsolidated zones may not be practical due, at least in part, to the high cost of most suitable resins.

Well bores frequently contain one or more of a casing string, a liner, or a similar pipe-like apparatus. In some instances, a channel called a "perforation" may penetrate the wall of the casing string or liner. Typically, a perforated casing string or liner contains a plurality of perforations, which may resemble fissures, pores, openings, or any other regular or irregular shaped apertures. Perforations may permit fluid communication between the area to the interior of the casing string or liner with the rest of the well bore and the subterranean formation. This fluid communication may be desirable, inter alia, to allow produced fluids to flow from the subterranean formation and into the casing string or liner or to facilitate the introduction of treatment fluids to the subterranean formation through the casing string or liner.

Oftentimes, debris may accumulate in perforations that penetrate well bore casing. The term "debris" as used herein refers to undesirable deposits that may reduce the permeability of the perforations, including, but not limited to, scale, asphaltene, waxes, precipitates, drilling mud, gel residues, corrosion products, formation fines and other geological deposits, deposits from stimulation operations, and any other type of damage. One source of debris may be the migration of in situ fines mobilized during production or injection which then lodge themselves in the perforations, reducing fluid flow there through. Debris may also occur, inter alia, as a result of changes in temperature and/or pressure that may chemically and/or physically alter the substances present in the subterranean formation. In addition, chemical reactions between substances in the subterranean formation may result in debris, such as precipitates. Examples of typical precipitates that contribute to debris accumulation are solid salts, e.g., inorganic salts such as calcium or barium sulfates, calcium carbonate, and calcium/barium scales. The accumulation of debris in or around perforations is disadvantageous because the debris may restrict the flow of production fluids into the interior of the perforated casing. The accumulation of debris in the perforations may also decrease the permeability of the perforations to desirable treatment fluids that are not native to the subterranean formation.

Traditional methods of reducing the harmful effects of particulate migration and debris accumulation have included repeated remedial treatments, e.g., workover treatments, which reduce the amount of debris in the well bore and improve hydrocarbon production. Oftentimes these treatments must be performed every few months, as each treatment strictly treats existing problems and does not prevent debris from entering or forming in the well bore in the future. The disadvantages of performing relatively frequent remedial treatments include the delay in hydrocarbon production that is required while the treatments are performed and the recurring cost of the fluids used during the treatments.

SUMMARY

The present invention relates to methods useful in treating subterranean formations, and more particularly, to consolidating relatively unconsolidated portions of subterranean formations and minimizing the flow back of unconsolidated particulate material (referred to collectively herein as "particulate migration").

In one embodiment, the present invention provides methods comprising providing a subterranean formation penetrated by a well bore wherein the well bore comprises perforated casing that comprises a plurality of perforations, providing an acidic treatment fluid comprising an aqueous base fluid and an acid composition, placing the acidic treatment fluid in the well bore in a manner that allows the acidic treatment fluid to reduce debris present in the perforations, providing a consolidating agent, and placing the consolidating agent in a near well bore region.

Another embodiment of the present invention provides methods comprising providing a subterranean formation penetrated by a well bore wherein the well bore comprises perforated casing that comprises a plurality of perforations, providing an acidic treatment fluid comprising an aqueous base fluid and an acid composition, placing the acidic treatment fluid in the well bore in a manner that allows the acidic treatment fluid to reduce debris presence in the perforations, providing a consolidating agent, placing the consolidating agent in a near well bore region, and allowing the consolidating agent to at least partially consolidate the near well bore region.

Yet another embodiment of the present invention provides methods comprising providing a subterranean formation penetrated by a well bore wherein the well bore comprises perforated casing that comprises a plurality of perforations, providing an acidic treatment fluid comprising an aqueous base fluid and an acid composition, placing the acidic treatment fluid in the well bore in a manner that allows the acidic treatment fluid to reduce debris present in the perforations, providing a consolidating agent, placing the consolidating agent in a near well bore region, allowing the consolidating agent to at least partially consolidate the near well bore region, providing a slurry comprising resin-coated proppant particulates, placing the slurry comprising resin-coated proppant particulates in the well bore in a manner and quantity sufficient to pack off the perforations and the interior of the casing across the perforated interval with resin-coated proppant particulates.

The features and advantages of the present invention will be readily apparent to those skilled in the art. While numerous changes may be made by those skilled in the art, such changes are within the spirit of the invention.

DESCRIPTION OF PREFERRED EMBODIMENTS

The present invention relates to methods useful in treating subterranean formations, and more particularly, to consolidating relatively unconsolidated portions of subterranean formations and minimizing the flow back of unconsolidated particulate material (referred to collectively herein as "particulate migration").

Of the many potential advantages of the current invention, one potential advantage may be an increase in the permeability of perforations in the casing of a well bore. Another potential advantage may be a reduction in particulate migration within a subterranean formation. Yet another potential advantage of some remedial treatments described herein may be a mitigation of the production of unconsolidated particulates with production fluids. Still another potential advantage of the present invention may be the reduced need to repeatedly perform workover treatments in a well bore. Other advantages and objects of the invention may be known to those skilled in the art upon reviewing this disclosure.

One embodiment of the present invention is a method comprising providing a subterranean formation penetrated by a well bore wherein the well bore comprises perforated casing that comprises a plurality of perforations, providing an acidic treatment fluid comprising an aqueous base fluid and an acid composition, placing the acidic treatment fluid in the well bore in a manner that allows the acidic treatment fluid to reduce debris present in the perforations, providing a consolidating agent, and placing the consolidating agent in a near well bore region. As used herein, the term "near well bore region" refers to a part of the formation that is within a distance from the well bore that is equal to approximately a few times the well bore's diameter.

In certain non-remedial embodiments of the present invention, the methods of the present invention may also include creating perforations in the well bore casing. The perforations allow fluid communication between the interior and exterior of the casing. As used herein, "perforated interval" refers to a section of cased well bore that has been perforated. Creating perforations in well bore casing may be accomplished through any perforating method known to one of ordinary skill in the art, including, but not limited to, the use of a perforating gun that fires shaped charges or a hydrajet tool that discharges abrasive fluid at high pressure. Both of these perforating processes are commercial services available through Halliburton Energy Services of Duncan, Okla. Creating perforations in well bore casing may be performed by the same or a different party than the party that performs the methods of the invention concerned with reducing perforation debris and consolidating the near well bore region; either is contemplated within the scope of this invention.

In other embodiments of the present invention, the casing of the well bore has already been perforated before the methods of the invention are implemented. These embodiments may involve formations wherein debris is present in the perforations, potentially creating an undesirable restriction on production. Additionally, these embodiments may be appropriate in cases where flow back of formation fines has begun to occur and needs to be remediated or an unstable formation surface needs to be remediated. Thus, one object of these embodiments may be to increase the permeability of the perforations to production fluids and treatment fluids and to reduce the amount of formation fines and other unconsolidated particulates in produced fluids.

A. Acidic Treatment Fluid

According to certain embodiments of the methods of the present invention, an acidic treatment fluid is placed in a well bore to reduce the amount of debris in the casing perforations. Generally, this step may increase the permeability of the perforations to production fluids and treatment fluids. The present invention contemplates that the acidic treatment fluid may reduce the amount of debris in the perforations through any physical or chemical mechanism, including but not limited to mechanically displacing or flushing the debris from the perforations or chemically reacting with the debris to dissolve, degrade, or otherwise chemically alter the debris. Therefore, in some embodiments, the acidic treatment fluid may result in an increase in the size of the perforations and/or an increase in the permeability of those openings. In certain preferred embodiments, the acidic treatment fluid may remove a substantial portion of the debris contained in the perforations in less than thirty minutes to two hours. In especially preferred embodiments, the acidic treatment fluid may remove a substantial portion of the debris contained in the perforations in less than thirty minutes to one hour.

The desired volume of the acidic treatment fluid introduced into the subterranean formation may be based, inter alia, on properties of the acidic treatment fluid used and characteristics of the subterranean formation to be treated, such as the length of the perforated interval and volume of the treatment zone, as well as the physical and chemical properties of the debris in the perforations. The cost of the acidic treatment fluid may also be a consideration in how much acidic treatment fluid to use and/or the concentration of an acid composition in the acidic treatment fluid. In some embodiments, from about 2 gallons to about 500 gallons of acidic treatment fluid will be used per foot of perforated interval.

Suitable acidic treatment fluids comprise an aqueous fluid and any acid composition suitable for use in subterranean operations. Examples of suitable aqueous fluids may include fresh water, salt water, brine, seawater, or any other aqueous fluid that, preferably, does not adversely interact with the other components used in accordance with this invention or with the subterranean formation. In some embodiments, the acid composition may be present in the acidic treatment fluid in an amount in the range of from about 1% to about 30% (volume/volume) of the acidic treatment fluid. In preferred embodiments, the acid composition may be present in the acidic treatment fluid in an amount in the range of from about 5% to about 15% (volume/volume) of the acidic treatment fluid. In some embodiments, the acid composition is present in the acidic treatment fluid in an amount in the range of from about 5 gallons to about 500 gallons per foot of perforated interval to be treated with the acidic treatment fluid. In preferred embodiments, the acid composition is present in the acidic treatment fluid in an amount in the range of from about 50 to about 200 gallons per foot of perforated interval to be treated with the acidic treatment fluid.

In some embodiments an acid composition is present in the acidic treatment fluid at a concentration in the range of from about 1% to about 30% (volume/volume). In more preferred embodiments, the acid composition is present in the acidic treatment fluid at a concentration in the range of from about 5% to 15% (volume/volume). In some embodiments, the acid composition is present in the acidic treatment fluid in an amount in the range of from about 5 gallons to about 500 gallons per foot of perforations to be treated with the acidic treatment fluid. In more preferred embodiments, the acid composition is present in the acidic treatment fluid in an amount in the range of from about 50 to about 200 gallons per foot of perforations to be treated with the acidic treatment fluid.

Examples of suitable acid compositions may include an acid, alcoholic acids, acid generating compounds, and combinations thereof. Examples of acids that may be suitable for use in the present invention include, but are not limited to, mineral acids, such as hydrochloric acid and hydrofluoric acid, and organic acids, such as formic acids, acetic acids, citric acids, phosphonic acid, glycolic acids, lactic acids, ethylenediaminetetraacetic acid ("EDTA"), hydroxyethyl ethylenediamine triacetic acid ("HEDTA"), etc., and combinations thereof. In some embodiments, the acid may be in solution with an aqueous solvent or any other cleaning solvent.

Alcoholic acids that may be suitable for use in the present invention include any mixture of an acid and an alcohol that does not adversely interact with the subterranean formation and/or the other components in the consolidating treatment. Examples of suitable alcoholic acids include a mixture of an alcohol, including, but not limited to, methyl alcohol, isopropyl alcohol, propanol, and combinations thereof; and an acid, including but not limited to, hydrochloric acid, hydrofluoric acid, formic acids, acetic acids, citric acids, phosphonic acid, glycolic acids lactic acids, ethylenediaminetetraacetic acid ("EDTA"), hydroxyethyl ethylenediamine triacetic acid ("HEDTA") and combinations thereof.

Examples of suitable acid generating compounds that may be suitable for use in the present invention include, but are not limited to, esters, aliphatic polyesters, ortho esters, poly (ortho esters), poly(lactides), poly(glycolides), poly($\epsilon$-caprolactones), poly(hydroxybutyrates), poly(anhydrides), aliphatic polycarbonates, poly(amino acids), poly(ethylene oxide), and polyphosphazenes, or copolymers thereof. Derivatives and combinations also may be suitable. Other suitable acid-generating compounds include: formate esters including, but not limited to, ethylene glycol monoformate, ethylene glycol diformate, diethylene glycol diformate, glyceryl monoformate, glyceryl diformate, glyceryl triformate, triethylene glycol diformate and formate esters of pentaerythritol. Other suitable materials may be disclosed in U.S. Pat. Nos. 6,877,563 and 7,021,383, the disclosures of which are incorporated by reference.

In those embodiments where an acid generating compound is used in the acidic treatment fluid, the acid generating compound may generate an acid downhole in a delayed fashion that may then acidize the formation. The acid generating compounds may be reacted with small amounts of reactive materials such as mineral acids, organic acids, acidic anhydrides, p-toluenesulfonic acid, and the like to lower the pH to accelerate the hydrolysis of the acid generating compound if desired. Similarly, the hydrolysis rate may be slowed by the addition of a small amount of a strong base such as NaOH, $Na_2CO_3$, and $Mg(OH)_2$. The acid generating compound also may generate alcohols downhole that may be beneficial to the operation. Additionally, these alcohols may be used to at least partially remove condensate blocks, or move or prevent water blocks in the formation. These alcohols may also act as hydrate inhibitors. Delayed generation of these alcohols can be beneficial in other ways as well. For instance, the production of these alcohols downhole may give the distinct advantage of being able to provide the alcohols downhole without having to pump them. This may be beneficial, for example, in some areas, where it may be problematic to pump an alcohol (e.g., when the environment has a temperature that is greater than the flash point of the alcohol or when environmental or cultural regulations do not permit the pumping of such alcohols), the delayed generation may be useful. Also, these generated alcohols may be preferred over standard alcohols because some standard alcohols contain chemical inhibitors that may interact with the chemistry within the well bore in such a way as to be problematic. Moreover, shipping and storing standard alcohols may be problematic. The particular alcohol given off depends on the acid generating compound being used. For instance, trimethylorthoformate gives off three molecules of methanol for each molecule of formic acid; the methanol may be useful for hydrate inhibition.

The acidic treatment fluids and any component of the acidic treatment fluids suitable for use in certain embodiments of the present invention may take on a variety of physical forms, including aqueous gels, viscoelastic surfactant gels, oil gels, foams and foamed gels, and emulsions. Suitable aqueous gels are generally comprised of water and one or more gelling agents. Suitable emulsions can be comprised of two immiscible liquids such as an aqueous liquid or gelled liquid and a hydrocarbon. Foams can be created by the addition of a gas, such as carbon dioxide or nitrogen. In certain embodiments of the present invention, the treatment fluids are aqueous gels comprised of water, a gelling agent for gelling the water and increasing its viscosity, and, optionally, a crosslinking agent for crosslinking the gel and further increasing the viscosity of the treatment fluid. The increased viscosity of the gelled, or gelled and cross-linked, treatment fluid, inter alia, may reduce fluid loss.

B. Consolidating Agents

The consolidating agents used in the present invention generally comprise any compound that is capable of minimizing particulate migration. No particular mechanism of consolidation or stabilization is implied by the term "consolidating agent." The consolidating agents used in the present invention may provide adhesive bonding between formation particulates to alter the distribution of the particulates within the formation in an effort to reduce their potential negative impact on permeability and/or fracture conductivity. In some embodiments, the consolidating agents may cause formation particulates to become involved in collective stabilized masses and/or stabilize the formation particulates in place to prevent their migration that might negatively impact permeability and/or fracture conductivity.

Consolidating agents suitable for use in the methods of the present invention may comprise compounds such as resins, aqueous or non-aqueous tackifying compositions, gelable compositions, and combinations thereof. The type and amount of consolidating agent included in a particular composition or method of the invention may depend upon, among other factors, the temperature of the subterranean formation, the chemical composition of formations fluids, flow rate of fluids present in the formation, and the like. It is within the ability of one of ordinary skill in the art, with the benefit of this disclosure, to determine the type and amount of consolidating agent to use according to the methods of the present invention so as to achieve the desired results. In some embodiments, suitable consolidating agents may have a relatively low viscosity. Thus, in some embodiments, the viscosity of the consolidating agent may be within the range of from about 1 centipoise ("cP") to about 50 cP. The techniques for achieving a desired viscosity vary according to the consolidating agent used, as discussed below.

1. Resins

In some embodiments of the present invention, the consolidating agent may comprise a resin. The term "resin" as used herein refers to any of numerous physically similar polymerized synthetics or chemically modified natural resins including thermoplastic materials and thermosetting materials. Resins suitable for use as a consolidating agent in the present invention include all resins known and used in the art.

One type of resin suitable for use in the methods of the present invention is a two-component epoxy based resin comprising a liquid hardenable resin component and a liquid hardening agent component. The liquid hardenable resin component is comprised of a hardenable resin and an optional solvent. The solvent may be added to the resin to reduce its viscosity for ease of handling, mixing and transferring. It is within the ability of one skilled in the art with the benefit of this disclosure to determine if and how much solvent may be needed to achieve a viscosity suitable to the present invention and the subterranean conditions. Factors that may affect this decision include geographic location of the well, the surrounding weather conditions, and the desired long-term stability of the consolidating agent. An alternate way to reduce the viscosity of the hardenable resin is to heat it. This method avoids the use of a solvent altogether, which may be desirable in certain circumstances. The second component is the liquid hardening agent component, which is comprised of a hardening agent, a silane coupling agent, a surfactant, an optional hydrolyzable ester for, among other things, breaking gelled fracturing fluid films on the proppant particulates, and an optional liquid carrier fluid for, among other things, reducing the viscosity of the hardening agent component.

Examples of hardenable resins that can be used in the liquid hardenable resin component include, but are not limited to, organic resins such as bisphenol A diglycidyl ether resin, butoxymethyl butyl glycidyl ether resin, bisphenol A-epichlorohydrin resin, bisphenol F resin, polyepoxide resin, novolak resin, polyester resin, phenol-aldehyde resin, urea-aldehyde resin, furan resin, urethane resin, a glycidyl ether resin, other similar epoxide resins and combinations thereof. The hardenable resin used is included in the liquid hardenable resin component in an amount in the range of from about 5% to about 100% by weight of the liquid hardenable resin component. In some embodiments the hardenable resin used is included in the liquid hardenable resin component in an amount of from about 25% to about 55% by weight of the liquid hardenable resin component. It is within the ability of one skilled in the art with the benefit of this disclosure to determine how much of the liquid hardenable resin component may be needed to achieve the desired results. Factors that may affect this decision include which type of liquid hardenable resin component and liquid hardening agent component are used.

Any solvent that is compatible with the hardenable resin and achieves the desired viscosity effect may be suitable for use in the liquid hardenable resin component. Suitable solvents may include butyl lactate, dipropylene glycol methyl ether, dipropylene glycol dimethyl ether, dimethyl formamide, diethyleneglycol methyl ether, ethyleneglycol butyl ether, diethyleneglycol butyl ether, propylene carbonate, methanol, butyl alcohol, d'limonene, fatty acid methyl esters, and combinations thereof. Other preferred solvents may include aqueous dissolvable solvents such as, methanol, isopropanol, butanol, glycol ether solvents, and combinations thereof. Suitable glycol ether solvents include, but are not limited to, diethylene glycol methyl ether, dipropylene glycol methyl ether, 2-butoxy ethanol, ethers of a $C_2$ to $C_6$ dihydric alkanol containing at least one $C_1$ to $C_6$ alkyl group, mono ethers of dihydric alkanols, methoxypropanol, butoxyethanol, hexoxyethanol, and isomers thereof. Selection of an appropriate solvent is dependent on the resin composition chosen and is within the ability of one skilled in the art with the benefit of this disclosure.

As described above, use of a solvent in the liquid hardenable resin component is optional but may be desirable to reduce the viscosity of the hardenable resin component for ease of handling, mixing, and transferring. It is within the ability of one skilled in the art, with the benefit of this disclosure, to determine if and how much solvent is needed to achieve a suitable viscosity. In some embodiments, the amount of the solvent used in the liquid hardenable resin component may be in the range of from about 0.1% to about 30% by weight of the liquid hardenable resin component. Optionally, the liquid hardenable resin component may be heated to reduce its viscosity, in place of, or in addition to, using a solvent.

Examples of the hardening agents that can be used in the liquid hardening agent component include, but are not limited to, piperazine, derivatives of piperazine (e.g., aminoethylpiperazine), 2H-pyrrole, pyrrole, imidazole, pyrazole, pyridine, pyrazine, pyrimidine, pyridazine, indolizine, isoindole, 3H-indole, indole, 1H-indazole, purine, 4H-quinolizine, quinoline, isoquinoline, phthalazine, naphthyridine, quinoxaline, quinazoline, 4H-carbazole, carbazole, β-carboline, phenanthridine, acridine, phenanthroline, phenazine, imidazolidine, phenoxazine, cinnoline, pyrrolidine, pyrroline, imidazoline, piperidine, indoline, isoindoline, quinuclindine, morpholine, azocine, azepine, 2H-azepine, 1,3,5-triazine, thiazole, pteridine, dihydroquinoline, hexa methylene imine, indazole, amines, aromatic amines, polyamines, aliphatic amines, cyclo-aliphatic amines, amides, polyamides, 2-ethyl-4-methyl imidazole, 1,1,3-trichlorotrifluoroacetone, and combinations thereof. The chosen hardening agent often effects the range of temperatures over which a hardenable resin is able to cure. By way of example and not of limitation, in subterranean formations having a temperature from about 60° F. to about 250° F., amines and cyclo-aliphatic amines such as piperidine, triethylamine, N,N-dimethylaminopyridine, benzyldimethylamine, tris(dimethylaminomethyl)phenol, and 2-($N_2$N-dimethylaminomethyl)phenol are preferred with N,N-dimethylaminopyridine most preferred. In subterranean formations having higher temperatures, 4,4'-diaminodiphenyl sulfone may be a suitable hardening agent. Hardening agents that comprise piperazine or a derivative of piperazine have been shown capable of curing various hardenable resins from temperatures as low as about 70° F. to as high as about 350° F. The hardening agent used may be included in the liquid hardening agent component in an amount sufficient to consolidate the coated particulates. In some embodiments of the present invention, the hardening agent used is included in the liquid hardening agent component in the range of from about 5% to about 95% by weight of the liquid hardening agent component. In other embodiments, the hardening agent used may be included in the liquid hardening agent component in an amount of about 15% to about 85% by weight of the liquid hardening agent component. In other embodiments, the hardening agent used may be included in the liquid hardening agent component in an amount of from about 15% to about 55% by weight of the liquid hardening agent component.

The silane coupling agent may be used, among other things, to act as a mediator to help bond the resin to formation particulates and/or proppant particulates. Examples of suitable silane coupling agents include, but are not limited to, N-β-(aminoethyl)-γ-aminopropyl trimethoxysilane, N-2-(aminoethyl)-3-aminopropyltrimethoxysilane, 3-glycidoxypropyltrimethoxysilane, and combinations thereof. The silane coupling agent used is included in the liquid hardening agent component in an amount capable of sufficiently bonding the resin to the particulate. In some embodiments of the present invention, the silane coupling agent used is included in the liquid hardening agent component in the range of from about 0.1% to about 3% by weight of the liquid hardening agent component.

Any surfactant compatible with the hardening agent and capable of facilitating the coating of the resin onto particulates in the subterranean formation may be used in the liquid hardening agent component. Such surfactants include, but are not limited to, an alkyl phosphonate surfactant (e.g., a $C_{12}$-$C_{22}$ alkyl phosphonate surfactant), an ethoxylated nonyl phenol phosphate ester, one or more cationic surfactants, and one or more nonionic surfactants. Mixtures of one or more cationic and nonionic surfactants also may be suitable. Examples of such surfactant mixtures are described in U.S. Pat. No. 6,311,773 issued to Todd et al. on Nov. 6, 2001, the relevant disclosure of which is incorporated herein by reference. The surfactant or surfactants that may be used are included in the liquid hardening agent component in an amount in the range of from about 1% to about 10% by weight of the hardening agent component.

While not required, examples of hydrolyzable esters that may be used in the liquid hardening agent component include, but are not limited to, a mixture of dimethylglutarate, dimethyladipate, and dimethylsuccinate; dimethylthiolate; methyl salicylate; dimethyl salicylate; dimethylsuccinate; t-butylhydroperoxide; and combinations thereof. When used, a hydrolyzable ester is included in the liquid hardening agent component in an amount in the range of from about 0.1% to about 3% by weight of the liquid hardening agent component. In some embodiments a hydrolyzable ester is included in the liquid hardening agent component in an amount in the range of from about 1% to about 2.5% by weight of the liquid hardening agent component.

Use of a diluent or liquid carrier fluid in the hardenable resin composition is optional and may be used to reduce the viscosity of the hardenable resin component for ease of handling, mixing and transferring. Any suitable carrier fluid that is compatible with the hardenable resin and achieves the desired viscosity effects is suitable for use in the present invention. Some suitable liquid carrier fluids are those having high flash points (e.g., about 125° F.) because of, among other things, environmental and safety concerns; such solvents include, but are not limited to, butyl lactate, butylglycidyl ether, dipropylene glycol methyl ether, dipropylene glycol dimethyl ether, dimethyl formamide, diethyleneglycol methyl ether, ethyleneglycol butyl ether, diethyleneglycol butyl ether, propylene carbonate, methanol, butyl alcohol, d'limonene, fatty acid methyl esters, and combinations thereof. Other suitable liquid carrier fluids include aqueous dissolvable solvents such as, for example, methanol, isopropanol, butanol, glycol ether solvents, and combinations thereof. Suitable glycol ether liquid carrier fluids include, but are not limited to, diethylene glycol methyl ether, dipropylene glycol methyl ether, 2-butoxy ethanol, ethers of a $C_2$ to $C_6$ dihydric alkanol having at least one $C_1$ to $C_6$ alkyl group, mono ethers of dihydric alkanols, methoxypropanol, butoxyethanol, hexoxyethanol, and isomers thereof. Selection of an appropriate liquid carrier fluid is dependent on, inter alia, the resin composition chosen.

Another resin suitable for use in the methods of the present invention are furan-based resins. Suitable furan-based resins include, but are not limited to, furfuryl alcohol resins, mixtures furfuryl alcohol resins and aldehydes, and a mixture of furan resins and phenolic resins. Of these, furfuryl alcohol resins are preferred. A furan-based resin may be combined with a solvent to control viscosity if desired. Suitable solvents for use in the furan-based consolidation fluids of the present invention include, but are not limited to 2-butoxy ethanol, butyl lactate, butyl acetate, tetrahydrofurfuryl methacrylate, tetrahydrofurfuryl acrylate, esters of oxalic, maleic and succinic acids, and furfuryl acetate. Of these, 2-butoxy ethanol is preferred.

Still another resin suitable for use in the methods of the present invention is a phenolic-based resin. Suitable phenolic-based resins include, but are not limited to, terpolymers of phenol, phenolic formaldehyde resins, and a mixture of phenolic and furan resins. Of these, a mixture of phenolic and furan resins is preferred. A phenolic-based resin may be combined with a solvent to control viscosity if desired. Suitable solvents for use in the phenolic-based consolidation fluids of the present invention include, but are not limited to butyl acetate, butyl lactate, furfuryl acetate, and 2-butoxy ethanol. Of these, 2-butoxy ethanol is preferred.

Yet another resin-type coating material suitable for use in the methods of the present invention is a phenol/phenol formaldehyde/furfuryl alcohol resin comprising from about 5% to about 30% phenol, from about 40% to about 70% phenol formaldehyde, from about 10 to about 40% furfuryl alcohol, from about 0.1% to about 3% of a silane coupling agent, and from about 1% to about 15% of a surfactant. In the phenol/phenol formaldehyde/furfuryl alcohol resins suitable for use in the methods of the present invention, suitable silane coupling agents include, but are not limited to, N-2-(aminoethyl)-3-aminopropyltrimethoxysilane, 3-glycidoxypropyltrimethoxysilane, and n-beta-(aminoethyl)-gamma-aminopropyl trimethoxysilane. Suitable surfactants include, but are not limited to, an ethoxylated nonyl phenol phosphate ester, mixtures of one or more cationic surfactants, and one or more non-ionic surfactants and an alkyl phosphonate surfactant.

2. Non-Aqueous Tackifying Compositions

In certain embodiments of the present invention, the consolidating agent comprises a non-aqueous tackifying composition. As used herein, the term "tackifying composition" refers to a material that exhibits a sticky or tacky character. Non-aqueous tackifying compositions suitable for use in the present invention comprise substantially any non-aqueous substance which, when in liquid form or in a solvent solution, will form a coating upon a particulate. One example of a suitable group of non-aqueous tackifying compositions comprises polyamides which are liquids or in solution at the temperature of the subterranean formation such that the polyamides are, by themselves, non-hardening when present on the particulates introduced into the subterranean formation. A particularly preferred product is a condensation reaction product comprised of commercially available polyacids and a polyamine. Such commercial products include compounds such as mixtures of C36 dibasic acids containing some trimer and higher oligomers and also small amounts of monomer acids that are reacted with polyamines. Other polyacids include trimer acids, synthetic acids produced from fatty acids, maleic anhydride and acrylic acid and the like. Such acid compounds are commercially available from companies such as Witco Corporation, Union Camp, Chemtall, and Emery Industries. The reaction products are available from, for example, Champion Technologies, Inc. and Witco Corporation. Additional compounds which may be used as tackifying compounds include liquids and solutions of, for example, polyesters, polycarbonates and polycarbamates, natural resins such as shellac and the like. Suitable tackifying compounds are described in U.S. Pat. No. 5,853,048 issued to Weaver, et al. and U.S. Pat. No. 5,833,000 issued to Weaver, et al., the disclosures of which are herein incorporated by reference.

It is within the ability of one skilled in the art, with the benefit of this disclosure, to determine whether a solvent is needed to achieve a viscosity suitable for the present invention and for the subterranean conditions and, if so, how much. Any solvent that is compatible with the non-aqueous tackifying compositions and achieves the desired viscosity effects is suitable for use in the present invention. The solvents that can be used in the present invention preferably include those having high flash points (most preferably above about 125° F.). Examples of solvents suitable for use in the present invention include, but are not limited to, butylglycidyl ether, dipropylene glycol methyl ether, butyl bottom alcohol, dipropylene glycol dimethyl ether, diethyleneglycol methyl ether, ethyleneglycol butyl ether, methanol, butyl alcohol, isopropyl alcohol, diethyleneglycol butyl ether, propylene carbonate, d'limonene, 2-butoxy ethanol, butyl acetate, furfuryl acetate, butyl lactate, dimethyl sulfoxide, dimethyl formamide, fatty acid methyl esters, and combinations thereof.

In certain embodiments, non-aqueous tackifying agents suitable for use in the present invention may be either used such that they form a non-hardening coating or they may be combined with a multifunctional material capable of reacting with the non-aqueous tackifying agent to form a hardened coating. A "hardened coating" as used herein means that the reaction of the tackifying compound with the multifunctional material will result in a substantially non-flowable reaction product that exhibits a higher compressive strength in a consolidated agglomerate than the tackifying compound alone with the particulates. In this instance, the non-aqueous tackifying agent may function similarly to a hardenable resin. Multifunctional materials suitable for use in the present invention include, but are not limited to, aldehydes such as formaldehyde, dialdehydes such as glutaraldehyde, hemiacetals or aldehyde releasing compounds, diacid halides, dihalides such as dichlorides and dibromides, polyacid anhydrides such as citric acid, epoxides, furfuraldehyde, glutaraldehyde or aldehyde condensates and the like, and combinations thereof. In some embodiments of the present invention, the multifunctional material may be mixed with the tackifying agent in an amount of from about 0.01% to about 50% by weight of the tackifying agent to effect formation of the reaction product. In some embodiments, the multifunctional material is present in an amount of from about 0.5% to about 1% by weight of the tackifying agent. Some other suitable multifunctional materials are described in U.S. Pat. No. 5,839,510 issued to Weaver et al., the relevant disclosure of which is herein incorporated by reference.

3. Aqueous Tackifying Compositions

In certain embodiments, the consolidating agent of the present invention comprises an aqueous tackifying composition. Aqueous tackifying compositions suitable for use in the present invention are not significantly tacky when placed into the subterranean formation, but are capable of being "activated" (that is destabilized, coalesced and/or reacted) to transform the compound into a sticky, tackifying compound at a desirable time. Such activation may occur before, during, or after the aqueous tackifying composition is placed in the subterranean formation. In some embodiments, a pre-treatment first may be contacted with the surface of a particulate to prepare it to be coated with an aqueous tackifying agent. Suitable aqueous tackifying compositions are generally charged polymers that comprise compounds that, when in an aqueous solvent or solution, will form a non-hardening coating (by itself or with an activator) and, when placed on a particulate, will increase the continuous critical resuspension velocity of the particulate when contacted by a stream of water. The aqueous tackifying compositions may enhance the grain-to-grain contact between the particulates within the formation (be they proppant particulates, formation fines, or other particulates), which may aid in the consolidation of the particulates into a cohesive, flexible, and permeable mass.

Examples of aqueous tackifying agents suitable for use in the present invention include, but are not limited to, acrylic acid polymers, acrylic acid ester polymers, acrylic acid derivative polymers, acrylic acid homopolymers, acrylic acid ester homopolymers (such as poly(methyl acrylate), poly (butyl acrylate), and poly(2-ethylhexyl acrylate)), acrylic acid ester co-polymers, methacrylic acid derivative polymers, methacrylic acid homopolymers, methacrylic acid ester homopolymers (such as poly(methyl methacrylate), poly(butyl methacrylate), and poly(2-ethylhexyl methacrylate)), acrylamido-methyl-propane sulfonate polymers, acrylamido-methyl-propane sulfonate derivative polymers, acrylamido-methyl-propane sulfonate co-polymers, and acrylic acid/acrylamido-methyl-propane sulfonate co-polymers and combinations thereof. Methods of determining suitable aqueous tackifying compositions and additional disclosure on aqueous tackifying compositions can be found in U.S. Patent Application Publication No. 2005/0277554, filed Jun. 9, 2004, and U.S. Pat. No. 7,131,491 issued Nov. 7, 2006, the relevant disclosures of which are hereby incorporated by reference.

4. Gelable Compositions

In some embodiments, the consolidating agents comprise a gelable composition. Gelable compositions suitable for use in the present invention include those compositions that cure to form a semi-solid, immovable, gel-like substance. The gelable composition may be any gelable liquid composition capable of converting into a gelled substance capable of substantially plugging the permeability of the formation while allowing the formation to remain flexible. As referred to in this disclosure, the term "flexible" refers to a state wherein the treated formation is relatively malleable and elastic and able to withstand substantial pressure cycling without substantial breakdown of the formation. Thus, the resultant gelled substance stabilizes the treated portion of the formation while allowing the formation to absorb the stresses created during pressure cycling. As a result, the gelled substance may aid in preventing breakdown of the formation both by stabilizing and by adding flexibility to the treated region. Examples of suitable gelable liquid compositions include, but are not limited to, (a) gelable resin compositions, (b) gelable aqueous silicate compositions, (c) crosslinkable aqueous polymer compositions, and (d) polymerizable organic monomer compositions.

(a) Gelable Resin Compositions

In some embodiments, the consolidating agent may comprise a gelable resin composition that cures to form a flexible gel. Unlike some of the resins described above, which are curable resins that cure into hardened masses, the gelable resin compositions cure into flexible, gelled substances that form resilient gelled substances. Gelable resin compositions allow the treated portion of the formation to remain flexible and to resist breakdown. Generally, the gelable resin compositions useful in accordance with this invention comprise a curable resin, a diluent, and a resin curing agent. When certain resin curing agents, such as polyamides, are used in the curable resin compositions, the compositions form the semi-solid, immovable, gelled substances described above. Where the resin curing agent used may cause the organic resin compositions to form hard, brittle material rather than a desired gelled substance, the curable resin compositions may further comprise one or more "flexibilizer additives" (described in more detail below) to provide flexibility to the cured compositions.

Examples of gelable resins that can be used in the present invention include, but are not limited to, organic resins such as polyepoxide resins (e.g., Bisphenol a-epichlorihydrin resins), polyester resins, urea-aldehyde resins, furan resins, urethane resins, and mixtures thereof. Of these, polyepoxide resins are preferred.

Any solvent that is compatible with the gelable resin and achieves the desired viscosity effect may be suitable for use in the present invention. Examples of solvents that may be used in the gelable resin compositions of the present invention include, but are not limited to, phenols; formaldehydes; furfuryl alcohols; furfurals; alcohols; ethers such as butyl glycidyl ether and cresyl glycidyl etherphenyl glycidyl ether; and mixtures thereof. In some embodiments of the present invention, the solvent comprises butyl lactate. Among other things, the solvent acts to provide flexibility to the cured composition. The solvent may be included in the gelable resin composition in an amount sufficient to provide the desired viscosity effect.

Generally, any resin curing agent that may be used to cure an organic resin is suitable for use in the present invention. When the resin curing agent chosen is an amide or a polyamide, generally no flexibilizer additive will be required because, inter alia, such curing agents cause the gelable resin composition to convert into a semi-solid, immovable, gelled substance. Other suitable resin curing agents (such as an amine, a polyamine, methylene dianiline, and other curing agents known in the art) will tend to cure into a hard, brittle material and will thus benefit from the addition of a flexibilizer additive. Generally, the resin curing agent used is included in the gelable resin composition, whether a flexibilizer additive is included or not, in an amount in the range of from about 5% to about 75% by weight of the curable resin. In some embodiments of the present invention, the resin curing agent used is included in the gelable resin composition in an amount in the range of from about 20% to about 75% by weight of the curable resin.

As noted above, flexibilizer additives may be used, inter alia, to provide flexibility to the gelled substances formed from the curable resin compositions. Flexibilizer additives may be used where the resin curing agent chosen would cause the gelable resin composition to cure into a hard and brittle material—rather than a desired gelled substance. For example, flexibilizer additives may be used where the resin curing agent chosen is not an amide or polyamide. Examples of suitable flexibilizer additives include, but are not limited to, an organic ester, an oxygenated organic solvent, an aromatic solvent, and combinations thereof. Of these, ethers, such as dibutyl phthalate, are preferred. Where used, the flexibilizer additive may be included in the gelable resin composition in an amount in the range of from about 5% to about 80% by weight of the gelable resin. In some embodiments of the present invention, the flexibilizer additive may be included in the curable resin composition in an amount in the range of from about 20% to about 45% by weight of the curable resin.

(b) Gelable Aqueous Silicate Compositions

In some embodiments, the consolidating agents of the present invention may comprise a gelable aqueous silicate composition. Generally, the gelable aqueous silicate compositions that are useful in accordance with the present invention generally comprise an aqueous alkali metal silicate solution and a temperature activated catalyst for gelling the aqueous alkali metal silicate solution.

The aqueous alkali metal silicate solution component of the gelable aqueous silicate compositions generally comprise an aqueous liquid and an alkali metal silicate. The aqueous liquid component of the aqueous alkali metal silicate solution generally may be fresh water, salt water (e.g., water containing one or more salts dissolved therein), brine (e.g., saturated salt water), seawater, or any other aqueous liquid that does not adversely react with the other components used in accordance with this invention or with the subterranean formation. Examples of suitable alkali metal silicates include, but are not limited to, one or more of sodium silicate, potassium silicate, lithium silicate, rubidium silicate, or cesium silicate. Of these, sodium silicate is preferred. While sodium silicate exists in many forms, the sodium silicate used in the aqueous alkali metal silicate solution preferably has a Na2O-to-SiO2 weight ratio in the range of from about 1:2 to about 1:4. Most preferably, the sodium silicate used has a Na2O-to-SiO2 weight ratio in the range of about 1:3.2. Generally, the alkali metal silicate is present in the aqueous alkali metal silicate solution component in an amount in the range of from about 0.1% to about 10% by weight of the aqueous alkali metal silicate solution component.

The temperature-activated catalyst component of the gelable aqueous silicate compositions is used, inter alia, to convert the gelable aqueous silicate compositions into the desired semi-solid, immovable, gelled substance described above. Selection of a temperature-activated catalyst is related, at least in part, to the temperature of the subterranean formation to which the gelable aqueous silicate composition will be introduced. The temperature-activated catalysts that can be used in the gelable aqueous silicate compositions of the present invention include, but are not limited to, ammonium sulfate (which is most suitable in the range of from about 60° F. to about 240° F.); sodium acid pyrophosphate (which is most suitable in the range of from about 60° F. to about 240° F.); citric acid (which is most suitable in the range of from about 60° F. to about 120° F.); and ethyl acetate (which is most suitable in the range of from about 60° F. to about 120° F.). Generally, the temperature-activated catalyst is present in the gelable aqueous silicate composition in the range of from about 0.1% to about 5% by weight of the gelable aqueous silicate composition.

(c) Crosslinkable Aqueous Polymer Compositions

In other embodiments, the consolidating agent of the present invention comprises a crosslinkable aqueous polymer composition. Generally, suitable crosslinkable aqueous polymer compositions comprise an aqueous solvent, a crosslinkable polymer, and a crosslinking agent. Such compositions are similar to those used to form gelled treatment fluids, such as fracturing fluids, but, according to the methods of the present invention, they are not exposed to breakers or delinkers and so they retain their viscous nature over time.

The aqueous solvent may be any aqueous solvent in which the crosslinkable composition and the crosslinking agent may be dissolved, mixed, suspended, or dispersed therein to facilitate gel formation. For example, the aqueous solvent used may be fresh water, salt water, brine, seawater, or any other aqueous liquid that does not adversely react with the other components used in accordance with this invention or with the subterranean formation.

Examples of crosslinkable polymers that can be used in the crosslinkable aqueous polymer compositions include, but are not limited to, carboxylate-containing polymers and acrylamide-containing polymers. Preferred acrylamide-containing polymers include polyacrylamide, partially hydrolyzed polyacrylamide, copolymers of acrylamide and acrylate, and carboxylate-containing terpolymers and tetrapolymers of acrylate. Additional examples of suitable crosslinkable polymers include hydratable polymers comprising polysaccharides and derivatives thereof and that contain one or more of the monosaccharide units galactose, mannose, glucoside, glucose, xylose, arabinose, fructose, glucuronic acid, or pyranosyl sulfate. Suitable natural hydratable polymers include, but are not limited to, guar gum, locust bean gum, tara, konjak, tamarind, starch, cellulose, karaya, xanthan, tragacanth, and carrageenan, and derivatives of all of the above. Suitable hydratable synthetic polymers and copolymers that may be used in the crosslinkable aqueous polymer compositions include, but are not limited to, polyacrylates, polymethacrylates, polyacrylamides, maleic anhydride, methylvinyl ether polymers, polyvinyl alcohols, and polyvinylpyrrolidone. The crosslinkable polymer used should be included in the crosslinkable aqueous polymer composition in an amount sufficient to form the desired gelled substance in the subterranean formation. In some embodiments of the present invention, the crosslinkable polymer is included in the crosslinkable aqueous polymer composition in an amount in the range of from about 1% to about 30% by weight of the aqueous solvent. In another embodiment of the present invention, the crosslinkable polymer is included in the crosslinkable aqueous polymer composition in an amount in the range of from about 1% to about 20% by weight of the aqueous solvent.

The crosslinkable aqueous polymer compositions suitable for use in the methods of the present invention further comprise a crosslinking agent for crosslinking the crosslinkable polymers to form the desired gelled substance. In some embodiments, the crosslinking agent is a molecule or complex containing a reactive transition metal cation. A most preferred crosslinking agent comprises trivalent chromium cations complexed or bonded to anions, atomic oxygen, or water. Examples of suitable crosslinking agents include, but are not limited to, compounds or complexes containing chromic acetate and/or chromic chloride. Other suitable transition metal cations include chromium VI within a redox system, aluminum III, iron II, iron III, and zirconium IV.

The crosslinking agent should be present in the crosslinkable aqueous polymer compositions in an amount sufficient to provide, inter alia, the desired degree of crosslinking. In some embodiments of the present invention, the crosslinking agent may be present in the crosslinkable aqueous polymer compositions of the present invention in an amount in the range of from about 0.01% to about 5% by weight of the crosslinkable aqueous polymer composition. The exact type and amount of crosslinking agent or agents used depends upon the specific crosslinkable polymer to be crosslinked, formation temperature conditions, and other factors known to those individuals skilled in the art.

Optionally, the crosslinkable aqueous polymer compositions may further comprise a crosslinking delaying agent, such as a polysaccharide crosslinking delaying agent derived from guar, guar derivatives, or cellulose derivatives. The crosslinking delaying agent may be included in the crosslinkable aqueous polymer compositions, inter alia, to delay crosslinking of the crosslinkable aqueous polymer compositions until desired. One of ordinary skill in the art, with the benefit of this disclosure, will know the appropriate amount of the crosslinking delaying agent to include in the crosslinkable aqueous polymer compositions for a desired application.

(d) Polymerization Organic Monomer Compositions

In other embodiments, the gelled liquid compositions suitable for use in the methods of the present invention comprise polymerizable organic monomer compositions. Generally, suitable polymerizable organic monomer compositions comprise an aqueous-base fluid, a water-soluble polymerizable organic monomer, an oxygen scavenger, and a primary initiator.

The aqueous-based fluid component of the polymerizable organic monomer composition generally may be fresh water, salt water, brine, seawater, or any other aqueous liquid that does not adversely react with the other components used in accordance with this invention or with the subterranean formation.

A variety of monomers are suitable for use as the water-soluble polymerizable organic monomers in the present invention. Examples of suitable monomers include, but are not limited to, acrylic acid, methacrylic acid, acrylamide, methacrylamide, 2-methacrylamido-2-methylpropane sulfonic acid, 2-dimethylacrylamide, vinyl sulfonic acid, N,N-dimethylaminoethylmethacrylate, 2-triethylammoniumethylmethacrylate chloride, N,N-dimethyl-aminopropylmethacryl-amide, methacrylamidepropyltriethylammonium chloride, N-vinyl pyrrolidone, vinyl-phosphonic acid, and methacryloyloxyethyl trimethylammonium sulfate, and mixtures thereof. Preferably, the water-soluble polymerizable organic monomer should be self-crosslinking. Examples of suitable monomers which are self crosslinking include, but are not limited to, hydroxyethylacrylate, hydroxymethylacrylate, hydroxyethylmethacrylate, N-hydroxymethylacrylamide, N-hydroxymethyl-methacrylamide, polyethylene glycol acrylate, polyethylene glycol methacrylate, polypropylene glycol acrylate, polypropylene glycol methacrylate, and mixtures thereof. Of these, hydroxyethylacrylate is preferred. An example of a particularly preferable monomer is hydroxyethylcellulose-vinyl phosphoric acid.

The water-soluble polymerizable organic monomer (or monomers where a mixture thereof is used) should be included in the polymerizable organic monomer composition in an amount sufficient to form the desired gelled substance after placement of the polymerizable organic monomer composition into the subterranean formation. In some embodiments of the present invention, the water-soluble polymerizable organic monomer is included in the polymerizable organic monomer composition in an amount in the range of from about 1% to about 30% by weight of the aqueous-base fluid. In another embodiment of the present invention, the water-soluble polymerizable organic monomer is included in the polymerizable organic monomer composition in an amount in the range of from about 1% to about 20% by weight of the aqueous-base fluid.

The presence of oxygen in the polymerizable organic monomer composition may inhibit the polymerization process of the water-soluble polymerizable organic monomer or monomers. Therefore, an oxygen scavenger, such as stannous chloride, may be included in the polymerizable monomer composition. In order to improve the solubility of stannous chloride so that it may be readily combined with the polymerizable organic monomer composition on the fly, the stannous chloride may be pre-dissolved in a hydrochloric acid solution. For example, the stannous chloride may be dissolved in a 0.1% by weight aqueous hydrochloric acid solution in an amount of about 10% by weight of the resulting solution. The resulting stannous chloride-hydrochloric acid solution may be included in the polymerizable organic monomer composition in an amount in the range of from about 0.1% to about 10% by weight of the polymerizable organic monomer composition. Generally, the stannous chloride may be included in the polymerizable organic monomer composition of the present invention in an amount in the range of from about 0.005% to about 0.1% by weight of the polymerizable organic monomer composition.

The primary initiator is used, inter alia, to initiate polymerization of the water-soluble polymerizable organic monomer (s) used in the present invention. Any compound or compounds that form free radicals in aqueous solution may be used as the primary initiator. The free radicals act, inter alia, to initiate polymerization of the water-soluble polymerizable organic monomer present in the polymerizable organic monomer composition. Compounds suitable for use as the primary initiator include, but are not limited to, alkali metal persulfates; peroxides; oxidation-reduction systems employing reducing agents, such as sulfites in combination with oxidizers; and azo polymerization initiators. Preferred azo polymerization initiators include 2,2'-azobis(2-imidazole-2-hydroxyethyl)propane, 2,2'-azobis(2-aminopropane), 4,4'-azobis(4-cyanovaleric acid), and 2,2'-azobis(2-methyl-N-(2-hydroxyethyl) propionamide. Generally, the primary initiator should be present in the polymerizable organic monomer composition in an amount sufficient to initiate polymerization of the water-soluble polymerizable organic monomer(s). In certain embodiments of the present invention, the primary initiator is present in the polymerizable organic monomer composition in an amount in the range of from about 0.1% to about 5% by weight of the water-soluble polymerizable organic monomer(s). One skilled in the art will recognize that as the polymerization temperature increases, the required level of activator decreases.

Optionally, the polymerizable organic monomer compositions further may comprise a secondary initiator. A secondary initiator may be used, for example, where the immature aqueous gel is placed into a subterranean formation that is relatively cool as compared to the surface mixing, such as when placed below the mud line in offshore operations. The secondary initiator may be any suitable water-soluble compound or compounds that may react with the primary initiator to provide free radicals at a lower temperature. An example of a suitable secondary initiator is triethanolamine. In some embodiments of the present invention, the secondary initiator is present in the polymerizable organic monomer composition in an amount in the range of from about 0.1% to about 5% by weight of the water-soluble polymerizable organic monomer(s).

Also optionally, the polymerizable organic monomer compositions suitable for use in the methods of the present invention further may comprise a crosslinking agent for crosslinking the polymerizable organic monomer compositions in the desired gelled substance. In some embodiments, the crosslinking agent is a molecule or complex containing a reactive transition metal cation. A most preferred crosslinking agent comprises trivalent chromium cations complexed or bonded to anions, atomic oxygen, or water. Examples of suitable crosslinking agents include, but are not limited to, compounds or complexes containing chromic acetate and/or chromic chloride. Other suitable transition metal cations include chromium VI within a redox system, aluminum III, iron II, iron III, and zirconium IV. Generally, the crosslinking agent may be present in polymerizable organic monomer compositions in an amount in the range of from 0.01% to about 5% by weight of the polymerizable organic monomer composition.

C. Slurry Comprising Resin-Coated Proppant Particulates

In accordance with certain embodiments of the methods of the present invention, a slurry comprising resin-coated proppant particulates is placed in the well bore so that the resin-coated proppant particulates fill both the well bore perforations and the interior of the casing across the perforated interval. When the resin coating on the proppant at least partially cures, the resin joins neighboring proppant particulates into a consolidated mass referred to as a "proppant pack." Then, a drill bit is used to drill through the cured proppant pack in the interior of the well bore. The well bore perforations remain filled with the cured proppant pack, which acts, inter alia, as a filter to prevent formation fines from entering the well bore with subsequently produced fluids.

Proppant particulates that are suitable for use in the present invention are generally of a size such that proppant particulates in contactable proximity function as a filter to prevent the through migration of formation fines. Proppant particulates may comprise any particulate material known in the art to be suitable for use in subterranean operations. Examples include, but are not limited to, sand, bauxite, ceramic materials, glass materials (e.g., glass beads), polymer materials, Teflon® materials, nut shell pieces, seed shell pieces, cured resinous particulates comprising nut shell pieces, cured resinous particulates comprising seed shell pieces, fruit pit pieces, cured resinous particulates comprising fruit pit pieces, wood, composite particulates, and combinations thereof. Composite particulates also may be used, wherein suitable composite materials may comprise a binder and a filler material wherein suitable filler materials include silica, alumina, fumed carbon, carbon black, graphite, mica, titanium dioxide, meta-silicate, calcium silicate, kaolin, talc, zirconia, boron, fly ash, hollow glass microspheres, solid glass, ground nut/seed shells or husks, saw dust, ground cellulose fiber, and combinations thereof. It should be understood that the term "particulate," as used in this disclosure, includes all known shapes of materials including substantially spherical materials, fibrous materials, polygonal materials (such as cubic materials) and mixtures thereof.

In accordance with the present invention, the proppant particulates (or some portion thereof) are coated with a resin. The term "coated" does not imply any particular degree of coverage of the proppant particulates with the resin. The proppant particulates may be coated by any suitable method as recognized by one skilled in the art with the benefit of this disclosure. In some embodiments, the resin-coated proppant comprises proppant that has been pre-coated by a commercial supplier. Suitable commercially available resin-coated proppant materials include, but are not limited to, pre-cured resin-coated sand, curable resin-coated sand, curable resin-coated ceramics, single-coat, dual-coat, or multi-coat resin-coated sand, ceramic, or bauxite. Some examples available from Borden Chemical, Columbus, Ohio, are "XRTTM CERAMAX P," "CERAMAX I," "CERAMAX P," "ACFRAC BLACK," "ACFRAC CR," "ACFRAC SBC," "ACFRAC SC," and "ACFRAC LTC." Some examples available from Santrol, Fresno, Tex., are "HYPERPROP G2," "DYNAPROP G2," "MAGNAPROP G2," "OPTIPROP G2," "SUPER HS," "SUPER DC," "SUPER LC," and "SUPER HT."

In place of pre-coated proppant particulates, certain embodiments use proppant particulates that are coated with a curable resin on-the-fly at the well site. The term "on-the-fly" is used herein to mean that a flowing stream is continuously introduced into another flowing stream so that the streams are combined and mixed while continuing to flow as a single stream as part of the on-going treatment. Such mixing may also be described as "real time" mixing. According to the present invention, both wet coating and dry coating are acceptable on-the-fly methods of coating the proppant with a curable resin.

The resin on the resin-coated proppant particulates facilitates the adherence and/or consolidation of a plurality of proppant particulates to form a solid mass, for example, after being placed in the perforations and well bore. The resin may be formulated so as to consolidate and/or adhere the plurality of proppant particulates to one another immediately, or it may be formulated such that it becomes "activated" after a certain amount of time or when contacted with another substance, at which point it becomes capable of consolidating and/or adhering the plurality of proppant particulates to one another. In some embodiments, the resin-coated proppants may be allowed to consolidate or adhere to one another at any point after the fluid comprising the proppant is introduced to the subterranean formation.

Resins suitable for coating the proppant particulates in certain embodiments of the present invention may include any resin known in the art that is capable of curing into a permeable, consolidated mass. Many such resins are commonly used in subterranean operations, and some suitable resins may include two component epoxy based resins, novolak resins, polyepoxide resins, phenol-aldehyde resins, urea-aldehyde resins, urethane resins, phenolic resins, furan resins, furan/furfuryl alcohol resins, phenolic/latex resins, phenol formaldehyde resins, polyester resins and hybrids and copolymers thereof, polyurethane resins and hybrids and copolymers thereof, acrylate resins, and mixtures thereof. Some suitable resins, such as epoxy resins, may be cured with an internal catalyst or activator so that when pumped downhole, they may be cured using only time and/or temperature. Other suitable resins, such as furan resins may require a time-delayed catalyst or an external catalyst to help activate the polymerization of the resins if the cure temperature is low (e.g., less than 250° F.), but may cure under the effect of time and/or temperature if the formation temperature is above about 250° F. By way of further example, selection of a suitable resin may be affected by the temperature of the subterranean formation. For subterranean formations having a bottom hole static temperature ("BHST") ranging from about 300° F. to about 600° F., a furan-based resin may be suitable. For subterranean formations having a BHST ranging from about 200° F. to about 400° F., either a phenolic-based resin or a one-component HT epoxy-based resin may be suitable. For subterranean formations having a BHST of at least about 175° F., a phenol/phenol formaldehyde/furfuryl alcohol resin also may be suitable. It is within the ability of one skilled in the art, with the benefit of this disclosure, to select a suitable resin for use in embodiments of the present invention and to determine whether a catalyst is required to trigger curing.

D. Optional Neutralizing Fluid

In some embodiments, a neutralizing fluid may be placed in the well bore after the acidic treatment fluid has been placed therein. The neutralizing fluid raises the pH of the near well bore area to a pH closer to 7. The role of the neutralizing fluid is to, inter alia, provide an environment that promotes better performance of any treatment substances that are subsequently placed in the well bore, especially treatment substances that do not perform well in acidic conditions. Suitable neutralizing fluids may be any fluid that has a tendency to raise the pH of an acidic formation environment to an approximate pH of 7 without adversely interacting with any other substance in the well bore. Examples of neutralizing fluids that may be suitable for use in the present invention include but are not limited to ammonium carbonate, ammonium bicarbonate, and sodium hydroxide, and other basic fluids. In some embodiments, the volume of neutralizing fluid used may be the volume needed to bring the pH of the formation to an approximate pH of 7.

E. Optional Afterflush Fluid

In some embodiments of the present invention, it may be desirable to place an afterflush fluid in the well bore after the consolidating agent has been placed therein. Suitable afterflush fluids comprise an aqueous liquid. The aqueous liquid used may be fresh water, salt water (e.g., water containing one or more salts dissolved therein), brine, seawater, or any other aqueous liquid that does not adversely react with the other components used in accordance with this invention or present within the subterranean formation. The use of an afterflush fluid is particularly recommended in embodiments in which the consolidating agent has a viscosity approaching or exceeding 50 cP.

In some embodiments, it is believed that the afterflush fluid may displace excess consolidating agent from productive pore spaces and well bore perforations. In preferred embodiments, what remains following the introduction of an afterflush fluid is a relatively concentrated film or layer of consolidating agent on the consolidated particulates. That layer of consolidating agent may act, inter alia, to prolong the production rates of the well at as a high a level as possible by controlling the movement of subterranean particulates and keeping them from plugging productive pore spaces and channels. The ability of the consolidating agent to form a thin layer on the formation particulates may allow the methods of the present invention to be useful even in situations where the pore spaces are relatively small, such as following an acidizing treatment, or before or after hydraulic fracturing, frac packing, water fracturing, and gravel packing.

F. Placing the Treatment Fluids in the Well Bore

Some embodiments of the present invention utilize a hydrajet tool to place one or more of the acidic treatment fluid, the neutralizing fluid, the consolidating agent, or the afterflush fluid into the well bore. The hydrajet tool may be capable of increasing or modifying the velocity and/or direction of the flow of a fluid into a subterranean formation from the velocity and/or direction of the flow of that fluid down a well bore. One of the potential advantages of using a hydrajet tool is that a fluid may be introduced adjacent to and localized to specific areas of interest along the well bore without the use of mechanical or chemical barriers. Some examples of suitable hydrajet tools are described in U.S. Pat. Nos. 5,765,642, 5,494,103, and 5,361,856, the relevant portions of which are hereby incorporated by reference.

In some embodiments in which a hydrajet tool is used, the fluid(s) introduced through the hydrajet tool are introduced at a pressure sufficient to result in the creation of at least one new fracture in the formation. In one example of a hydrajetting operation carried out at an elevated pressure, a hydrajetting tool having at least one fluid jet forming nozzle is positioned adjacent to a formation to be fractured, and fluid is then jetted through the nozzle against the formation at a pressure sufficient to form a cavity or slot therein to fracture the formation by stagnation pressure in the cavity. Because the jetted fluids would have to flow out of the slot in a direction generally opposite to the direction of the incoming jetted fluid, they are trapped in the slot and create a relatively high stagnation pressure at the tip of a cavity. This high stagnation pressure may cause a micro-fracture to be formed that extends a short distance into the formation. That micro-fracture may be further extended by pumping a fluid into the well bore to raise the ambient fluid pressure exerted on the formation while the formation is being hydrajetted. Such a fluid in the well bore will flow into the slot and fracture produced by the fluid jet and, if introduced into the well bore at a sufficient rate and pressure, may be used to extend the fracture an additional distance from the well bore into the formation.

In the embodiments which use a hydrajet tool to introduce one or more of the acidic treatment fluid, the neutralizing fluid, the consolidating agent, or the afterflush fluid into the subterranean formation, the slurry comprising resin-coated proppant particulates may be introduced to the subterranean formation through the annulus between the hydrajet tool and the outer wall of the well bore. According to some embodiments of the present invention, whether or not a hydrajet tool is used to introduce other fluids, the slurry comprising a resin-coated proppant may be placed in the well bore with sufficient pressure to deform or extend at least one fracture in the subterranean formation.

Therefore, the present invention is well adapted to attain the ends and advantages mentioned as well as those that are inherent therein. The particular embodiments disclosed above are illustrative only, as the present invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered or modified and all such variations are considered within the scope and spirit of the present invention. In particular, every range of values (of the form, "from about a to about b," or, equivalently, "from approximately a to b," or, equivalently, "from approximately a-b") disclosed herein is to be understood as referring to the power set (the set of all subsets) of the respective range of values, and set forth every range encompassed within the broader range of values. Also, the terms in the claims have their plain, ordinary meaning unless otherwise explicitly and clearly defined by the patentee.

What is claimed is:

1. A method comprising:
   providing a subterranean formation penetrated by a well bore wherein the well bore comprises perforated casing that comprises a plurality of perforations;
   providing an acidic treatment fluid comprising an aqueous base fluid and an acid composition;
   placing the acidic treatment fluid in the well bore at a rate lower than the fracture rate of the near well bore region using a hydrajet tool in a manner that allows the acidic treatment fluid to reduce debris present in the perforations;
   providing a consolidating agent; and
   placing the consolidating agent in a near well bore region at a rate lower than the fracture rate of the near well bore region using a hydrajet tool.

2. The method of claim 1 further comprising placing a neutralizing fluid in the well bore after the acidic treatment fluid has been placed in the well bore, wherein the neutralizing fluid raises the pH of the near well bore region to an approximate pH of 7.

3. The method of claim 2 wherein the neutralizing fluid is placed in the well bore via a hydrajet tool.

4. The method of claim 1 further comprising placing an afterflush fluid in the well bore after the consolidating agent has been placed in the well bore.

5. The method of claim 4 wherein the afterflush fluid is placed in the well bore via a hydrajet tool.

6. The method of claim 1 wherein the consolidating agent comprises at least one consolidating agent selected from the group consisting of: a curable resin, an aqueous tackifying composition, a non-aqueous tackifying composition, a gelable composition, and combinations thereof.

7. The method of claim 1 further comprising contacting the consolidating agent with a substance that promotes the consolidating ability of the consolidating agent.

8. The method of claim 1 wherein the perforated casing is initially placed in the well bore as a solid or unperforated section of casing and is thereafter perforated to create the plurality of perforations in the casing.

9. The method of claim 1 further comprising placing a slurry that comprises resin-coated proppant particulates in the well bore.

10. The method of claim 9 wherein the slurry that comprises resin-coated proppant particulates is placed in the well bore at a pressure sufficient to create and/or extend one or more fractures in the subterranean formation.

11. The method of claim 9 wherein the slurry that comprises resin-coated proppant particulates is placed in the well bore in a manner and quantity sufficient to pack off the perforations and the interior of the casing across the perforated interval with resin-coated proppant particulates.

12. The method of claim 11 further comprising using a drill bit to drill through at least a portion of the proppant pack that is located in the interior of the casing.

13. The method of claim 9 further comprising allowing the resin that coats the particulates to at least partially cure so as to consolidate proppant particulates that are in contactable proximity into a proppant pack.

14. The method of claim 9 further comprising contacting the slurry that comprises resin-coated proppant particulates with a substance that promotes curing of the resin coating.

15. A method comprising:
providing a subterranean formation penetrated by a well bore wherein the well bore comprises perforated casing that comprises a plurality of perforations;
providing an acidic treatment fluid comprising an aqueous base fluid and an acid composition;
placing the acidic treatment fluid in the well bore at a rate lower than the fracture rate of the near well bore region using a hydralet tool in a manner that allows the acidic treatment fluid to reduce debris presence in the perforations;
providing a consolidating agent;
placing the consolidating agent in a near well bore region at a rate lower than the fracture rate of the near well bore region using a hydrajet tool;
placing an afterflush fluid in the well bore after the consolidating agent has been placed in the well bore; and,
allowing the consolidating agent to at least partially consolidate the near well bore region.

16. The method of claim 15 further comprising contacting the consolidating agent with a substance that promotes the consolidating ability of the consolidating agent before placing the afterflush fluid.

17. The method of claim 15 further comprising placing a neutralizing fluid in the well bore after the acidic treatment fluid has been placed in the well bore, wherein the neutralizing fluid raises the pH of the near well bore region to an approximate pH of 7.

18. The method of claim 17 wherein the neutralizing fluid is placed in the well bore via a hydrajet tool.

19. A method comprising:
providing a subterranean formation penetrated by a well bore wherein the well bore comprises perforated casing that comprises a plurality of perforations;
providing an acidic treatment fluid comprising an aqueous base fluid and an acid composition;
placing the acidic treatment fluid in the well bore at a rate lower than the fracture rate of the near well bore region using a hydrajet tool in a manner that allows the acidic treatment fluid to reduce debris present in the perforations;
providing a consolidating agent;
placing the consolidating agent in a near well bore region at a rate lower than the fracture rate of the near well bore region using a hydrajet tool;
placing an afterflush fluid in the well bore after the consolidating agent has been placed in the well bore;
allowing the consolidating agent to at least partially consolidate the near well bore region;
providing a slurry comprising resin-coated proppant particulates;
placing the slurry comprising resin-coated proppant particulates in the well bore in a manner and quantity sufficient to pack off the perforations and the interior of the casing across the perforated interval with resin-coated proppant particulates.

20. The method of claim 19 further comprising allowing the resin that coats the particulates to at least partially cure so as to consolidate proppant particulates that are in contactable proximity into a proppant pack.

21. The method of claim 20 further comprising using a drill bit to drill through at least a portion of the proppant pack that is located in the interior of the casing.

* * * * *